US007362852B1

(12) United States Patent
Rodkey et al.

(10) Patent No.: US 7,362,852 B1
(45) Date of Patent: *Apr. 22, 2008

(54) SCHOOL-WIDE NOTIFICATION AND RESPONSE SYSTEM WITH ENHANCED ADMINISTRATOR FUNCTION

(75) Inventors: Ryan Scott Rodkey, Sugar Land, TX (US); John Frank Rodkey, Missouri City, TX (US); David Lynn Hickey, Rosharon, TX (US); Darren Lynn Ross, Sugar Land, TX (US)

(73) Assignee: Techradium, Inc., Houston, TX (US)

( * ) Notice: Subject to any disclaimer, the term of this patent is extended or adjusted under 35 U.S.C. 154(b) by 121 days.

This patent is subject to a terminal disclaimer.

(21) Appl. No.: 11/477,167

(22) Filed: Jun. 28, 2006

Related U.S. Application Data

(63) Continuation-in-part of application No. 11/132,542, filed on May 19, 2005, now Pat. No. 7,174,005, which is a continuation-in-part of application No. 11/117,594, filed on Apr. 28, 2005, now Pat. No. 7,130,389.

(51) Int. Cl.
*H04M 1/64* (2006.01)
(52) U.S. Cl. .............................. 379/88.12; 379/88.23; 379/252; 455/414.2
(58) Field of Classification Search ................ 379/79, 379/88.12, 88.19, 201.01, 252; 455/414.2
See application file for complete search history.

(56) References Cited

U.S. PATENT DOCUMENTS

| 6,463,462 | B1 | 10/2002 | Smith ..................... 709/206 |
| 6,496,568 | B1 | 12/2002 | Nelson .................... 379/88.12 |
| 6,697,477 | B2 | 2/2004 | Fleischer ............... 379/211.02 |
| 6,871,214 | B2 | 3/2005 | Parsons ..................... 709/206 |
| 6,912,691 | B1 | 6/2005 | Dodrill ..................... 715/513 |
| 6,931,415 | B2 | 8/2005 | Nagahara ................... 707/102 |
| 2002/0032020 | A1 | 3/2002 | Brown ...................... 455/414 |

*Primary Examiner*—Gauthier Gerald
(74) *Attorney, Agent, or Firm*—Buskop Law Group, PC; Wendy Buskop

(57) ABSTRACT

A school-wide notification and response system utilizing an administrator interface to transmit a message from an administrator to contact devices for parents, employees, and students associated with a school. The system includes an interface with a translator, a call me feature, and a call in feature enabling a customer service representative to use the system to send a message to users. The system has a dynamic information database that includes parent, employee, and student contact data, priority information, and response data. The administrator initiates distribution of the message based upon grouping information, priority information, and the priority order. The message is transmitted through at least two industry standard gateways simultaneously to selected group contact devices based upon priority information. Once the message is received by the contact devices, the contact devices then transmit a response through the industry standard gateways back to the dynamic information database.

23 Claims, 4 Drawing Sheets

SCHOOL-WIDE NOTIFICATION AND RESPONSE SYSTEM WITH ENHANCED ADMINISTRATOR FUNCTION

CROSS REFERENCE TO RELATED APPLICATIONS

The present application is a Continuation-in-Part of U.S. patent application Ser. No. 11/132,542; Entitled "School-Wide Notification and Response System," filed on May 19, 2005, now issued as U.S. Pat. No. 7,174,005, which claims priority from U.S. patent application Ser. No. 11/117,594; Entitled "Digital Notification and Response System," filed on Apr. 28, 2005, now issued as U.S. Pat. No. 7,130,389.

FIELD

The present embodiments relate generally to the creation and delivery of messages, to the routing, the verification and collection of responses to the messages to parents and employees associated with a school or a school system. The system and methods are universally applicable to, and independent of, the type of messaging system and device selected by the message recipients.

More particularly, the present embodiments relate to an immediate response information system or emergency system for parents and employees associated with a school or a school system.

BACKGROUND

Schools and their parent and employees need a system to send and receive information using a variety of messaging formats, systems, and message receiving devices. For example, a school that is closed due to flooding needs to contact the parents and employees quickly. Often the messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types. The system needs to work in conjunction with recipient rules routing, verification of notification and response, and collection of responses in a predefined format.

A need exists for a digital information and response system to bridge the gap between the government and the public for communication without being limited to one device.

A need exists for a method of communication from an administrator which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
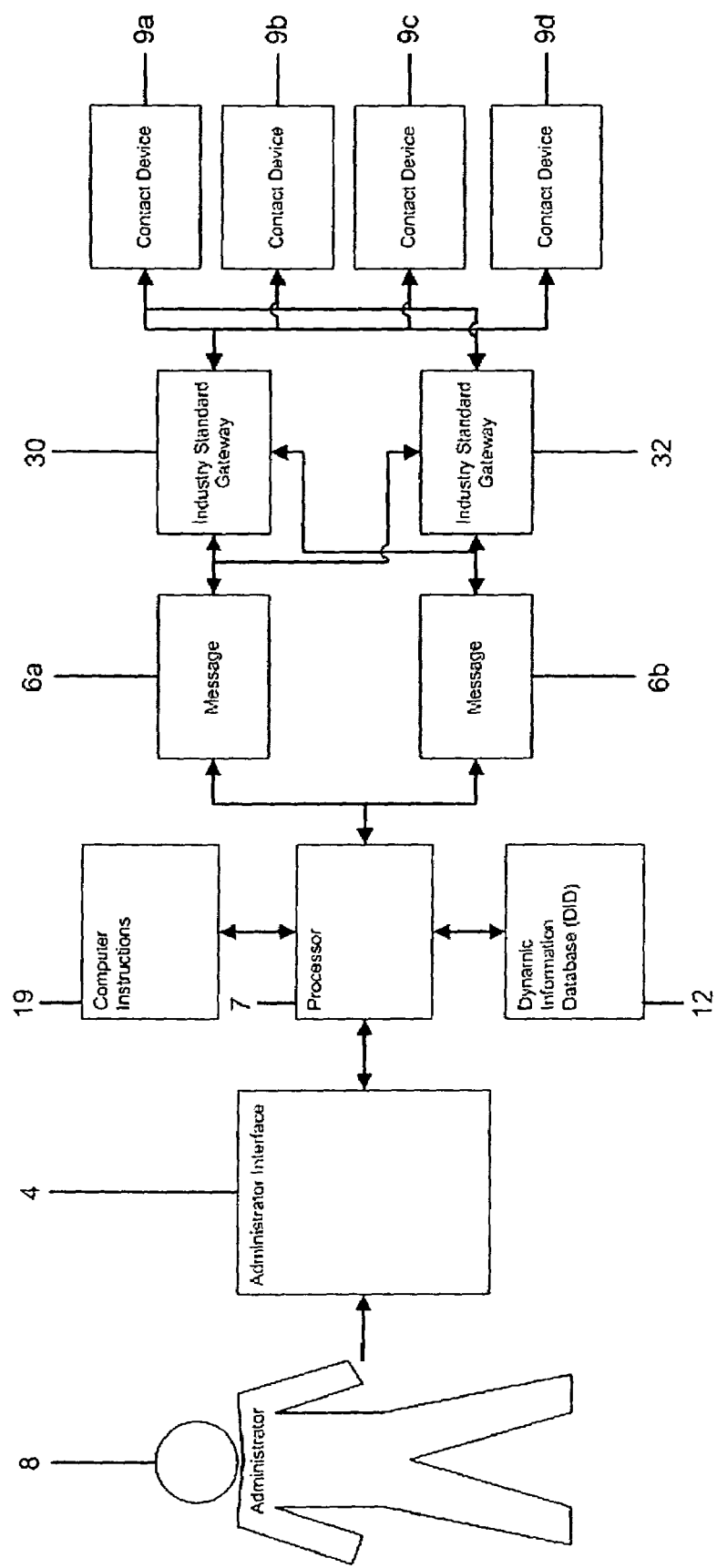
FIG. 1 depicts a representation of an embodiment of a digital notification and response system.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that it can be practiced or carried out in various ways.

The present embodiments relate to an immediate response information or emergency system for a school or school system. The embodied methods provide better communication with parents other than using conventional telephone.

The embodied methods provide an emergency communication system that ensures parents, students and employees of a school are contacted simultaneously to a chosen first user device, such as an email, or a cellular phone, or a Blackberry™.

The present embodiments relate to system that can be used for both emergency use and for improved communication between parents and students. For example, the system can be used to notify a parent when a child is missing from school. The systems can be used to advise parents of PTA meetings, sports events, early dismissals which a student might be reluctant to tell his or her parents. The system provides as a benefit in that parents can be notified that report cards are being sent home. Parents can be notified when special homework assignments, such as book reports, are due.

The embodied methods and systems can be used to provide information updates to parents on power outages, snow days, flood days, and other school closures, such as from leaking roofs, or a smoking furnace. Mundane information, such as a need for a school physical prior to the start of school, information on overdue library books, and information regarding a students poor eating habits at school, can also be transmitted easily to parents.

An embodied method can be used to reduce terrorism and terrorism related activities associated with schools.

The embodied methods can be used to contact school board members concerning school board meetings, changes in curriculum, and information related to safety in the schools information. This present embodiments are designed to save lives, prevent vandalism, and keep neighborhoods near the schools free of drug problems and other harmful situations.

The system can simultaneously advise parents, police, and employees about a drug abuse situation. The system can be adapted to provide a tip line for students. For example, the tip line can be a call in feature for students to let high school or other school officials notify someone when a crime or drug abuse situation is witnessed. The tip line can be useful in reducing crime and providing a safe environment in the school.

The embodied methods provide a manner for the information to be transmitted to parents and employees in "real time" or nearly immediately. The system is designed to be operational throughout the school year. The system can maintain a current database of contact information for parents, students and employees. In the context of the present application, the term "parents" refers to biological parents, foster parents, guardians, uncles and aunts designated as caretakers for children, grandparents designated as caretakers, or others which are recognized as the caretakers of the student in the school to which this system applies.

With the scope of this application, the term "employee" refers to teachers, other faculty, janitors, coaches, contractors to the school, principals, secretaries, superintendents, consultants to the schools, school board members, coordinators, security personnel, counselors, maintenance personnel for the school, and other individuals that work on the facility, in the facility, or in conjunction with school activities.

The present embodiments relate to the creation and delivery of messages, and to the routing, and to the verification and collection of responses to the messages to parents, students and employees of a school or a school system. The system and methods are universally applicable to, and independent of, the type of messaging system and device selected by the message recipients. The present embodiment relates to the simultaneous transmission of a message in multiple languages to a user device, wherein the recipient of the message selects the language for transmission to the recipient.

The embodied immediate response information systems provide a timely and uniform manner to contact numerous users through numerous user contact devices, such as a cell phone, a television, a LED display, a land phone line, an e-mail address, a fax machine, a pager, a digital display, two way radios, short wave radios, similar devices, and handheld wireless device, including PDAs and a Blackberry™.

The system is used to contact parents and employees and even other students in the case of emergency conditions, such as storms or fire, and in the case of informational situations, such as school closings.

The present embodiments provide a system that has a high speed notification and response system in which information is accessed and stored in a dynamic information database. The systems can be set to contact parents, students, and employees automatically when specific conditions arise or to contact parents, students and employees when initiated by an administrator. The systems can be set to contact a large number of parents, students, and employees in a systematic manner based upon priority.

The present embodiments can be used to save lives because the system can notify large groups of individuals concerning very dangerous situations quickly to many different devices. The system can be used to stop rumors that a situation is safe. This system stops panic and chaos, because the system can send a consistent message to all parents and employees on the system.

The embodied immediate response information systems provide other benefits, such as general information update, which are not emergency situations. For example, a message can be sent such as "bring a flower to your teacher tomorrow because it is her birthday" to all parents of students in a second grade class using the system.

For the purpose of the embodiments, the following definitions shall be used:

"Translator" shall refer to a person, computer, multiple persons, multiple computers, or combinations thereof used to translate from first language to different language for user with user devices.

"Access Code" shall refer to a secure, unique identifier assigned to an individual. This access code can include: a personal identification number (PIN), a caller ID, a phone number, a unique identifier that is a combinations of a user's birth date and last four digits of a user's social security number, a social security number or combinations thereof.

"Unregistered number" is a phone number not recognized by the emergency response and notification system.

"Specified time" shall refer to a date and time that a message is scheduled to be delivered or cancelled or combination thereof.

"Predefined intervals" shall mean time periods during which messages are intended to be delivered.

"Message" shall refer to the typed or recorded communication transmitted by words, signals, or other means from one person, station, or group to another. The message can be transmitted using text-to-speech software, and or voice recognition software.

"Geographic area" refers to an identifiable or demarcated area of the Earth.

"Geographic feature" is a term that refers to the computer instructions used for selecting at least one geographic area containing users for which the message is to be transmitted.

"Designated disaster zone" means an area that officially qualifies for emergency governmental aid as a result of a catastrophe, such as an earthquake or flood or man-made event, such as chemical plant explosion or terrorism.

"Response code" refers to a Dual-Tone Multi-Frequency (DTMF) tone, interactive voice recognition (IVR) via a phone, web page form or link.

"Designated language" is a term that means the preferred language of a user.

"User identification code" can be any number of codes, including but not limited to a caller ID or registered phone number.

"Reliable source" means an information source such as local, national or global news networks, weather center, government agency, associated press, or other global information company.

"Opt-in feature" refers to a process that allows users to participate in the system.

"Opt-out feature" refers to a process that allows users to remove themselves from the system.

"School" as the term is used herein refers to public schools, charter school, universities, day care centers, secondary schools, elementary schools, parochial schools, private schools, institutional training programs, vocational schools, kindergartens, elder care centers, and similar institutions.

"Corresponding voice" as the term is used herein refers to the spoken or broad cast audio of a message which can be a recorded person's voice or a text-to-speech generated audio using a computer program.

An embodiment of the system can be as follows: A principal of a high school, in this example the administrator, wants to send the following message to all parents of students and employees associated with the school.

The principal goes to his computer, goes to the web browser, and clicks on the site that contains the administrator interface, such as "irisdispatch.com".

The site is the administrator interface used to transmit the message to the parents and employees via a contact device. Once the web interface comes up, the principal enters the site using with a user name and a password, such as Jerry Spears, password: 123jsp.

The principal types in the message, "A chemical leak has occurred at a nearby chemical plant. We are canceling school and urge all children, parents, and employees of Dobie High School to stay indoors. All outside activities are cancelled."

Once the message is entered, the principal presses the send button. The system proceeds using the processor with computer instructions to automatically to do the following:

a. The system identifies that the employees of Dobie High School are the first priority group for this type of message. The system transmits the message to each employee's contact device based upon the contact information in the database.

b. The system identifies that the parents of Dobie High School students are the second priority group for this type of message. Likewise, system transmits the message to each parent's contact device based upon the contact information in the database.

c. The system continues to contact groups based upon priority groupings for this type of message.

d. Each contact device returns a response that the information has been received. The database stores the information into a database for report generation on demand.

e. The system continues to transmit the message to contact devices that have not responded until all contact devices have received the message or until the principal ends the transmission.

The embodiments in the most broad example, includes a customer service interface which has a translator, a call me feature, a call in feature to enable a customer service representative to call the school wide digital notification and response system and send a message to one or more users using information stored in a dynamic information database (DID). The DID can be on school property or remote to the school.

As a second example, an embodiment of the system can be utilized as follows: At a high school, a student appears in classroom with a handgun and seems to be threatening other students. A teacher sees the behavior and runs to the administrator interface console in the school. In this example, the administrator interface console is a dedicated computer with an icon that allows for quick access to the administrator interface. The teacher accesses the interface with a user name and password, and selects a predefined message from the initial page of the web interface. In this case, the teacher sends the following message: "Need Police Assistance at Clearwater High immediately" and, then, adds a custom message: "Room 22." The message is transmitted to priority groups based upon priority order. In this case, the police department receives the message first since the police are recognized by the system as the first priority group for this type of message. The system then proceeds like the first example in contacting all devices and collecting all responses.

With reference to the figures, FIG. 1 examples an embodiment of the school wide digital notification and response system, wherein an administrator (8) can transmit one or more messages (6a and 6b) to one or more parents and employees contact devices (9a, 9b, and 9c) or student contact device (9d) using an administrator interface (4).

Figure 2:
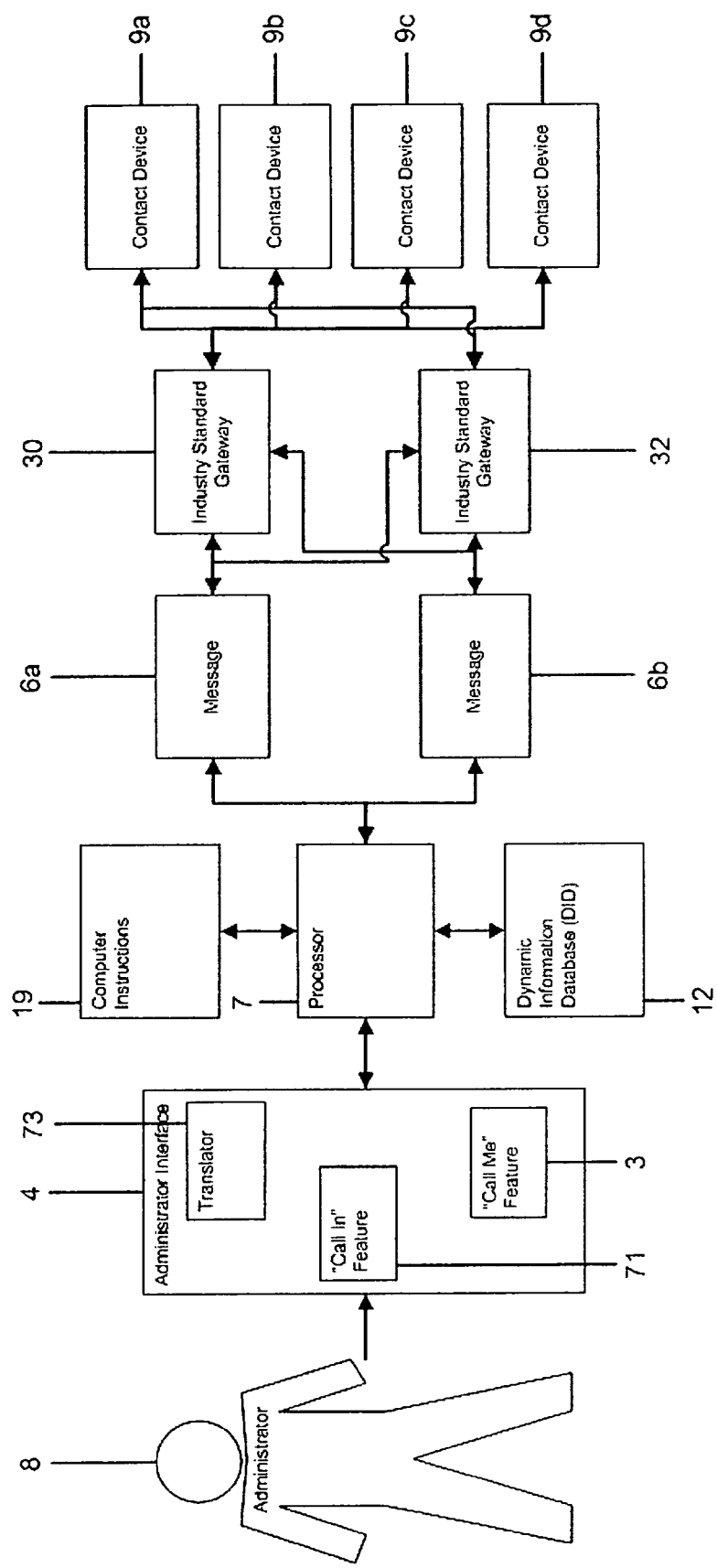
FIG. 2 depicts a representation of an embodiment of a administrator interface with "call me feature" associated with a digital notification and response system.

The administrator interface (4) which is a control unit, is shown in more detail in FIG. 2 includes an administrator "call me" feature (3) enabling an administrator (8) to record a message (6a) using a processor (7) having a dynamic information database (12) which communicates with various computer instructions (19) which can be in remote data storage for delivery to one or more user contact devices (9a, 9b, 9c, or 9d). The "call me" feature enables the administrator to use the processor to record a message which can be sent out to users of the contact devices. The administrator interface has a "call in" feature (71) which is a control device, that enables an administrator, a parent, student, or an employee of the school to call into the system and communicate via the administrator interface (4). As part of the administrator interface (4), a translator (73) exists electronically to record messages in real time with user selected languages.

Figure 3:
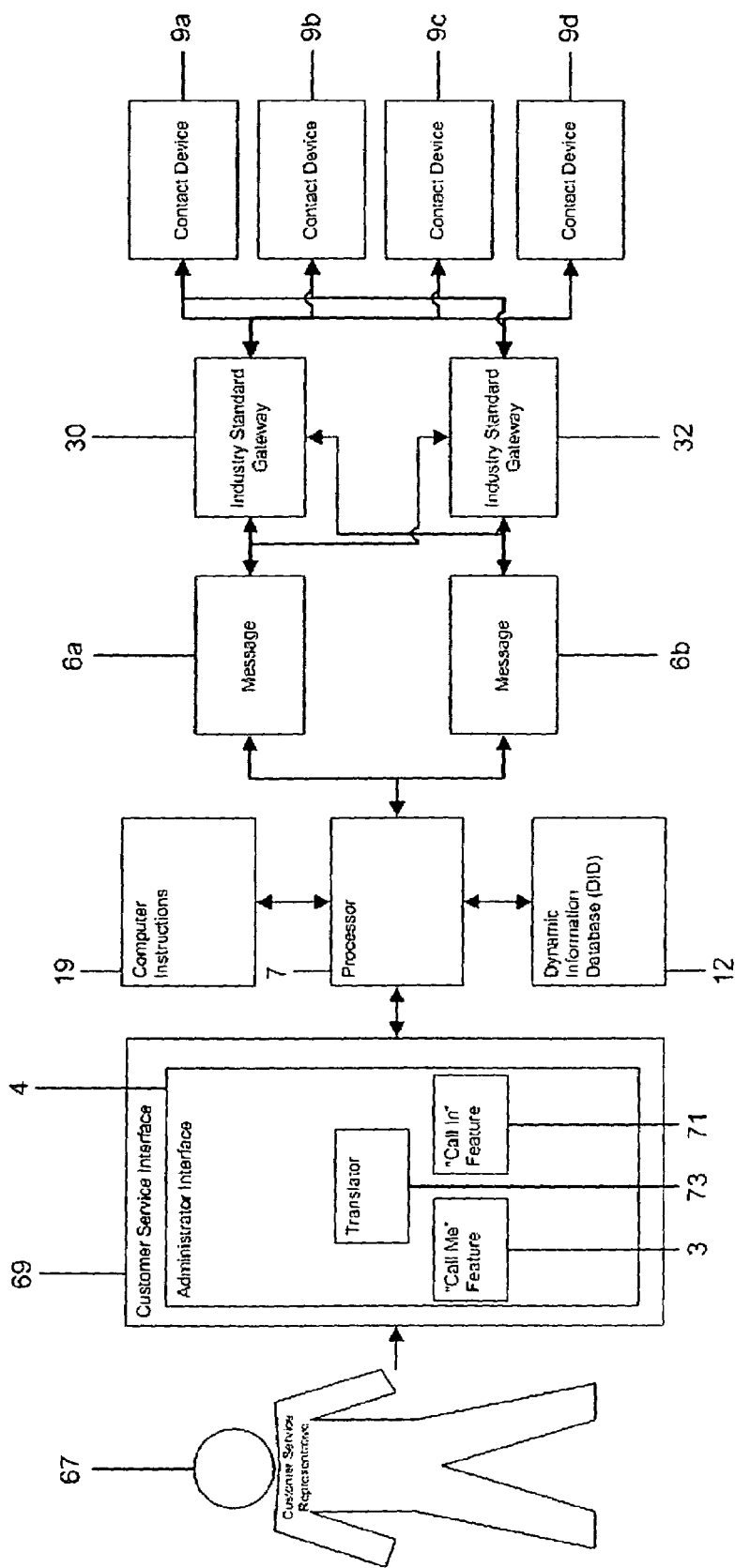
FIG. 3 depicts a representation of an embodiment of a customer service interface and features associated with a digital notification and response system.

FIG. 3 shows a customer service interface (69) communicates a customer service representative (67) with the dynamic information database (12) and the processor (7) using computer instructions (19). The customer service interface has a "call in" feature (71) which is a control device, that enables an administrator, a parent, student, or an employee of the school to call into the system and communicate via the customer service interface (69). As part of the customer service interface (69), a translator (73) exists, either at the school or electronically to record messages in real time with user selected languages. The customer service interface (69) can use the call me feature (3) enabling a customer service representative (67) to record a message (6a or 6b) for delivery to the contact devices (9a, 9b, 9c and 9d).

Returning to FIG. 1 and FIG. 2, the administrator (8) can be a person, a computer, an analog emergency notification system, or another digital notification and response system or the like. The customer service representative can be a person, a computer, an analog emergency notification system, or another digital notification and response system.

The administrator (8) interacts with the administrator interface (4) to begin the process of sending a message to the parent, employee, or student contact devices (9a, 9b, 9c and 9d).

The administrator interface (4) can be a local area network interface, a wide area network interface, a virtual private network interface, asynchronous transfer mode interface, synchronous optical network interface, a call center, a voice mail, or other similar means to transmit a message to numerous contacts. The customer interface can operate over a local area network interface, a wide area network interface, a virtual private network interface, asynchronous transfer mode interface, synchronous optical network interface, a call center, a voice mail, or other similar means to transmit a message to numerous contacts.

The message (6a or 6b) can be a text message, a numerical message, one or more images or a combination of these. The message can be encoded. The message can include a designation that identifies the importance the message. Examples of these designations include low priority, general priority, significant priority, high priority, and severe priority. The designations can be color-coded, such as green for a low priority message, blue for a preparedness message or general priority message, yellow for a cautionary message such as a significant priority, orange for an emergency message or high priority message, or red for a critical message with a severe priority. These priority levels can be customized and tailored to standards for a particular school or school system.

As seen in FIG. 1, the message (6a or 6b) is transmitted to one or more parent, employee, or student contact device (9a, 9b, 9c and/or 9d). Examples of usable contact devices include handheld wireless devices, wireless phones, land phones, e-mail addresses, digital displays, and LED display, fax machines, pagers, and similar devices that capable of receiving a message. An example of a handheld device includes a PDA, a blackberry, or cellular phone.

The message (6a or 6b) is stored on a dynamic information database (DID) (12). The message can be a prewritten message stored in the database for subsequent use by the administrator or can be generated from the dynamic information database (12) based upon inputs from the administrator and transmitted using the administrator interface.

Figure 4:
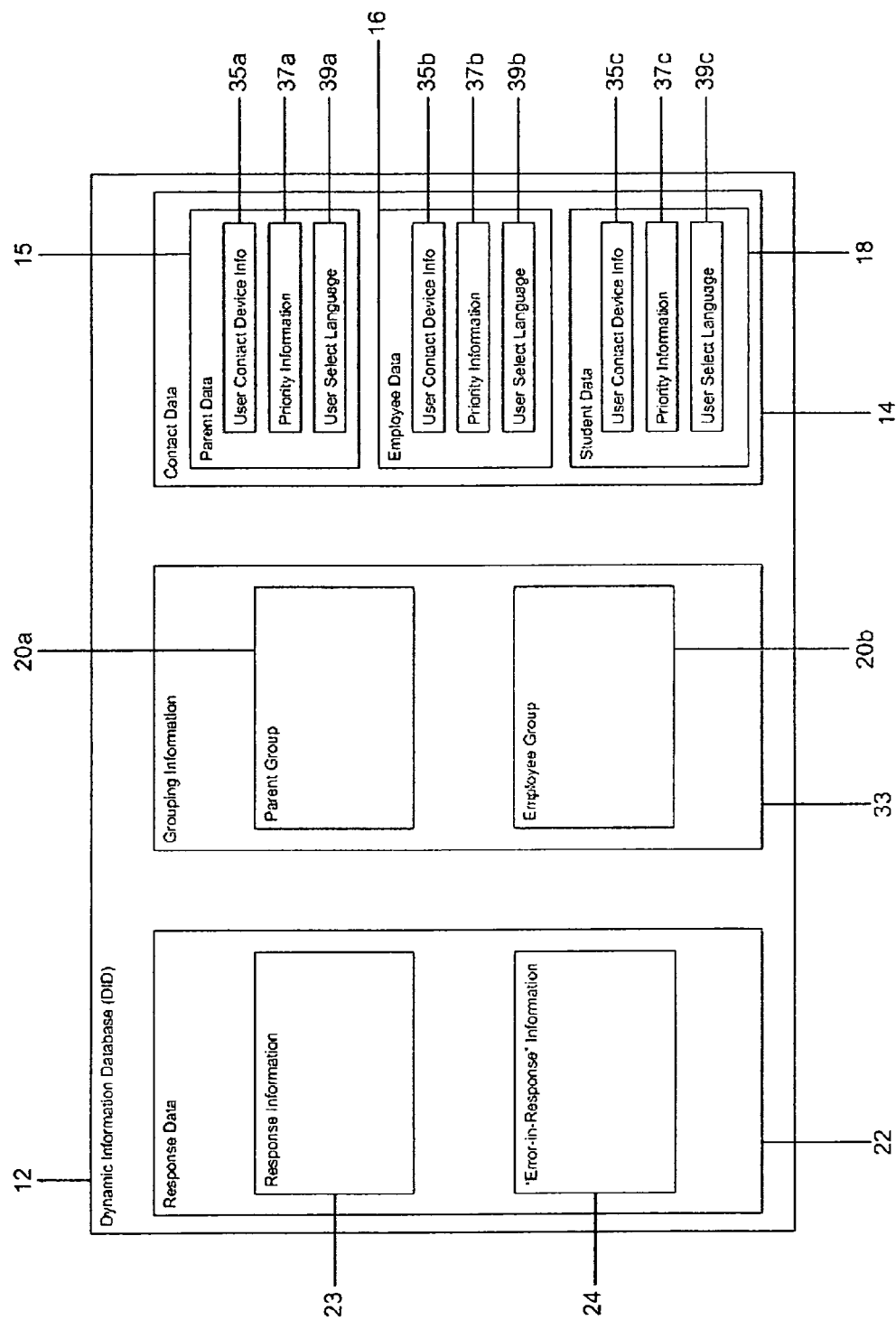
FIG. 4 is a schematic of the dynamic information database associated with a digital notification and response system.

FIG. 4 shows a schematic of the dynamic information database (12). The dynamic information database (12) includes three sections: contact data (14), grouping information (33), and response data (22).

Contact data (14) includes parent's contact data (15), employee's contact data (16) and student's contact data (18). The dynamic information database (12) can be an SQL™ database, MySQL™ database or other industry standard databases, an Oracle™ database, or other similar database that can organize information in a similar manner.

The contact data (14) in the dynamic information database (12) includes contact information for parents, employee and students indicated as (35a, 35b, and 35c), priority information (37a, 37b, and 37c), and user selected language preferences (39a, 39b, and 39c) for the message. The contact data (14) includes information related with the parent and/or employee associated to the user contact device. The user, within the scope of this application, is a person that can receive a message, send a message, respond to a message, or combinations thereof. Examples of users can include individuals, a parent of a child, guardians of a child, a teacher of a child, a security company, a school board member, a firefighter, a police officer, an emergency worker, or combinations thereof.

The contact information (35a, 35b, and 35c) includes information concerning both the contact device and the parents, students and/or employees. The contact information can include an e-mail address, an internet protocol (IP) address, a phone number, and combinations thereof. The contact information can further include a name, an address, a phone number, a device address, a social security number, an account code, and combinations thereof. Each contact device can include information that is unique to each individual parent, student and/or employee contact device or can include information that is common to all contact devices. For example, an electronic serial number for a cell phone, a mac address for an Ethernet card and so on.

The priority information (37a, 37b, and 37c) is used to indicate a contact order for various contact devices of the parents, employees, and students. The contact order is used to direct the order in which the dynamic information database (DID) transmits a message to the contact devices.

The contact data (14) can include information beyond the examples listed in order to aid the DID in contacting the user contact devices. For example, Mrs. Smith has a phone extension of 1234 in addition to her phone number.

Continuing with FIG. 4, the grouping information (33) in the dynamic information database (12) is used to group the parents, employees or students together into separable and identifiable groups for ease of contact by an administrator.

The grouping information (33) can include one or more groups, such as a parent group (20a) and an employee group (20b) associated with the contact data (14). By grouping the parents and employees, the system provides the benefit of more efficient delivery of information without having to treat each user individually. Grouping more efficiently defined message recipients speeds the delivery of the message.

The grouping information can include a predefined group identified in the dynamic information database. The predefined group can be identified by the administrator or by another user in advance to sending the message. Examples of groupings include parents of a second grade class, an alumni class from a specific year, hazmat response teams, janitors, superintendents, school board members, teachers, and other similar groupings.

The grouping information (33) further includes a priority order for contacting each parent and employee within the group (20a and 20b). The priority order directs the administrator interface as to the order in which the interface should contact the individual contact devices with the message. The priority order provides the benefit of ensuring that the most critical parents and employees receive the message first in case time is not available to contact all of the users. The priority order also provides the benefit that all parents and employees get contacted with equal priority, rather than a discriminating message delivery priority. The priority order guarantees that all users get contacted to on a preferred device first.

The response data (22) in the dynamic information database (12) is directed towards information based upon whether the contact device and, in turn, the parent and/or employee received the message. The response data (22) includes response information (23) that indicates whether the parent and/or employee and or student has received the message.

The response information (23) is gathered by the dynamic information database (12). The response data (22) further includes "error-in-response" information (24) that indicates the contact data (14) is insufficient and can not be delivered properly. The error in response information (24) can also indicate that an e-mail address or phone number is simply invalid.

Additionally, student contact data (18) is included in the database (12). This student contact data can include student user contact device information and student priority information that indicates a contact order for the student contact device. For example, student contact data might be coded into the database as a number for the contact device and the type of contact device and a student priority information for calling the contact devices of the student. For example for a student called Ryan Rodkey has student data which is 713-403-7411 cell phone then 713-269-7676 home phone, or RocketRyan@Ryanburger.com.

Other student, employee and parent data can include but is not limited to: student address, parent address, employee address, grade level, employee position, phone extensions, student name, employee name, parent name, latitude, longitude, geocode, birth date, social security number, employee id, student id, school level, school name, school phone number and school address.

Returning to FIG. 1, the administrator (8) can initiate a distribution of one or more messages (6a and 6b). The system can be initiated by the processor (7) automatically using computer instructions (19) once a message is created. Fire alarms when set off, can automatically alert the system, and then the system can automatically advise a user. Another example is that the system can tie to a tracking system, so that if a child misses certain periods of school, the system can advise the parent that the student is missing those classes.

An administrator can call the customer service interface from an unregistered number, provide an access code, to obtain messages specific to the access code, send messages specific to the access code, or update messages specific to the access code. For example, Mr. Smith needs to send an important message out to all parents within a district but he is not at a computer. He then uses his telephone to call the customer service interface. The interface recognizes his caller ID or he enters his registered phone number and then he is able to create or change a message.

An administrator can have a customer service interface that includes connection with the administrator translator or even and additional, second translator which can be a person for translating the message to be transmitted into the user selected language. One or more translators can be used simultaneously which can be people or people and machine translators, or just machine translators.

The messages (6a and 6b) are transmitted through at least two industry standard gateways (30 and 32) simultaneously. By transmitting the message (6) through numerous gateways, the system provides redundancy in order to ensure the message is relayed to the parents and employees.

The priority order directs the administrator interface (4) to contact a first group of contact devices (9a) indicated as a first contact. After all of the contact devices in the first contact have received the message, the priority order directs the administrator interface (4) to contact a second group of contact devices (9b) indicated as a second contact. Then, the administrator interface continues to relay messages to contact devices based on the priority order until all contact devices are reached and a response is provided from the contact devices.

Once the message is received by a contact device, the contact device (9a, 9b, 9c and 9d) transmits a response back through the industry standard gateways (30 and 32) to the dynamic information database (12). The dynamic information database (12) stores the responses and the unique address of each user contact device.

In an alternative embodiment, the system can include reporting information in order to generate reports based upon information in the dynamic information database (12). The reports can be generated by the administrator, the user, a group, or combinations thereof. The reports can include a date the message was sent, a time the message was sent, a date the message was received, a time the message was received, content of the message, a recipient of the message, recipient information related to the recipient of the message, and combinations thereof. Other examples include the name of the person who received the message, a copy of the voice mail, a time when an e-mail was accessed, the time when a fax is printed and so on. The administrator can create custom designed reports, or standard reports can be generated from the dynamic information database for use by the administrator.

The translator can be a machine language converter, it is adapted to translate a text message to a second language. The language converter is often referred to as a text translator. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language, thereby causing a breakdown in the communication between groups of people due to language. The system allows the user to designate a specific language in which to receive the message. The chosen language is stored in the dynamic information database (12) with the user contact data.

In an alternative embodiment, the system can include a text-to-sound file converter. The text-to-sound file converter can be used to translate a message from text to a sound file. The text-to-sound file converter is beneficial because the message is consistent using the same voice, with the same accent, same dynamic, and same delivery speed. The text-to-sound file converter enables individuals with disabilities, namely visual impairment, to also receive the consistent message.

The claimed notification and response system provides quick delivery speed. The system can send alert messages to thousands of recipients in about thirty seconds with the click of a single mouse. In the event of computer failure, the network can be contacted toll free from any phone to get the message directly from an administrator. Every second counts when a student is drowning in the school swimming pool or some other crisis is occurring. This notification system alerts people who need to respond right away.

The claimed notification and response system provides format and message flexibility. The emergency response system can reach numerous recipients on numerous types of contact devices virtually at the same time. For example, the system can contact telephones, cell phones, digital pagers, fax machines, wireless PDA devices, email systems, computer system tray icons, Amber alert systems, and LED signs. Voice and text can be delivered in numerous languages as specified by recipients. The system can enable parents of students who do not speak English well to be notified and act on an emergency message enabling immigrant families to act quickly as well as native English speaking families. Since the claimed system solves the language barrier problems, the system is vital to states that have large non-English speaking family populations, such as Texas, California, and Florida.

The embodied emergency system provides message consistency. The notification system can be used to deliver exactly the same message to all recipients to prevent confusion and rumor control. Message inconsistency can cause people to go to the wrong location or follow conflicting directions in the case of a bomb threat, terrorist action, or other act of extreme violence.

The system can be used to prevent bombing and bomb threats. For example, the locker bomb explosion in January 1999 in a high school in Kansas City sent eleven students to the hospital. If a silent alarm or alert system had been triggered to all the teachers when the bomb threat was known, a quick evacuation of the school could have occurred in order to prevent the injuries or deaths.

In another example, a Maryland School district experienced more than one hundred and fifty bomb threats with fifty-five associated arrests in a single school term of nine months. If the claimed notification system was in place, the cost of notifying the parents and teachers and employees of the school system would have been less than the cost incurred in notifying students, parents, and authorities. The messages could have been delivered quickly and simultaneously to aid in evacuating schools or warning students from coming to school. The quick messages could also have led to quicker arrests since more people were aware of the problem. The system would have also provided a consistent message in order to quell rumors.

The claimed notification and response system provides receipt verification. The notification and response system automatically verifies message receipt and saves data for a variety of reports. Receipt verification of an emergency situation helps saves lives by providing accountability to the schools. Schools can show that the required parities were sent the needed message and that the message was received by those individuals.

The embodied emergency system provides a system that provides significant cost savings to schools and school systems. The systems use devices that users, parents, teachers, and workers already have in order to transmit and receive messages. The system does not require additional hardware. Since the system is more cost effective, more schools and school systems can afford the notification system. Schools in the poorest school districts in the country with massive drug abuse and drinking problems can afford to use this system to stop harm and save lives.

The claimed notification and response system are reliable. The systems provides digital, broadband, fail-safe, multiformat rapid verification and response communication connected to the world's most reliable internet communications network. This reliability saves lives because police, fire, security, and medical professionals can be notified at any time upon indications of an alarm. Reliable messages lead to fast response and saved lives.

A feature of an embodiment is that a user can call the customer service interface from an unregistered number, provide an access code, to obtain messages specific to the access code, or send message specific to the access code.

The translator can be a person for live translating of the message to be transmitted into the user selected language. For example, a live person can read a message in Spanish just as it is being recorded in English at the administrator interface.

An additional embodiment is a feature for broadcasting the message at a specified date and time, such as later in the day or at another day, after an initial message. For example if the initial message was created at 5 pm, the feature for broadcasting later enables the administer to broadcast at 11 pm that same day, or every 11 pm every day thereafter for a week.

In another embodiment of the method enables administrators to cancel messages in progress. Another embodiment enables administrators to cancel messages scheduled for delivery at a future date and time. For example, on Tuesday, Darren has decided that a message scheduled for delivery on Friday needs to be cancelled. He then logs into the administrator interface and cancels the message.

Still another feature of the method includes the step of notifying an administrator when all messages have been delivered. For example, an administrator might be notified by administrator interface that of 100 message sent, 89 were received, and provide a list of the 11 missing names.

An additional embodiment involves a feature for broadcasting the message at predetermined periodic intervals, such as every hour, or every two hours. These intervals can be separated by days or by weeks. For example, the message might be to vaccinate your child, and the message is provided monthly to the parents of the children in school.

An embodiment can also include a geographic feature which enables a user to select messages and transmit messages to users within a particular zip code or defined geographic area, such as all of Sugar Land, Tex. For example, flooding is happening near a river, and the town authorities want to alert all the residents along the river to flooding, without having to notify and entire town. The geographic feature enable that modification.

An embodiment can also include the feature which enables a user to identify a group of wireless phones to receives messages within the aforementioned geographic area. For example, the feature would enable a predefined group of users of Sprint phones in the 77019 zip code to receive the message because their area is near a railroad track where a train carrying hazardous material derailed and is now leading a toxic gas into the atmosphere.

The embodiments can also include a feature wherein users in a designated disaster zone are selectable, for contact such as all users in the Gulf Coast in the way of an impending hurricane are selected. Alternatively, it could be all residents near the levies in New Orleans that gave way, which is not zip code specific, disaster zone specific. This feature alone, if used at the World Trade Towers probably would have saved countless lives from the deadly terrorist attack, alerting everyone in the world trade towers to evacuate.

Still another embodiment contemplates that the administrator interface has a reservation feature for reserving a conference room for group communication. For example, John has decided to hold a conference call between all of his administrators enabling them to discuss the small trash can fire in a classroom while they are in route to the problem. Using the system, he dynamically creates a conference room. When the system calls the users, they then have the option of selecting to join the conference room while in route to the small fire situation.

An embodiment can also contemplate that the message requests a response enabling at least one user to enter a reserved conference in a group communication via phone or computer That is, the message may read, press #5 to join the first responders on conference call to hear what they are instructing people to do.

Still another embodiment the administrator interface can have a security feature to control access to the administrator interface selected from the group: biometric reader, magnetic card reader, smart card reader, a security token or combinations thereof. That is, the system may have an administrator interface that is security controlled, so that telemarketers and other individuals who should not have access to these private records, can not gain that access. Accordingly, the administrator worker, can have a fingerprint on file at a database, connected to a fingerprint reader which only enables a designated worker to have access to the database and administrator interface. Similarly, a magnetic card with a card reader, or a smart card with chip and a processor for communicating a complicated security code procedure would be usable for controlling access to the phone numbers and devices of the users, ensuring privacy to the system.

The embodiments include using various industry standard gateways include a member from the group: a Megaco/H.248 protocol, a Media Gateway Control Protocol (MGCP), a Short Message Service (SMS) protocol, an Enhanced Message Service (EMS) protocol, a Multimedia Message Service (MMS) protocol, SIP Protocols, or combinations thereof. For example, a usable protocol would be Megaco/H.248 RFC3261; MGCP RFC3435/3661; SMS RFC1568/1645/1861; EMS RFC4355; or MMS RFC4356/4355.

A feature of still another embodiment is that it can provide two simultaneous gateways, and in another embodiment three or more simultaneous gateways for communication the message to a plurality of user devices.

An embodiment can include an administrator interface dubbed the "call me" feature. This feature enables a customer service representative or an administrator to compose a message to send out to a designated user or to groups of user in at least one designated language with corresponding designated voice for alerting the designated user or groups of user with a custom recorded message. As an example, the call me feature would work to allow the administrator to record a message that Hightower Elementary will begin roof repairs tomorrow at 11 and there will be an early dismissal.

The message of the embodiments can be embedded as an audio file, wherein the audio files are transmitted to the user or groups of users. These audio files can be transmitted by email, phone, via a link on a website or as combinations of these elements.

An embodiment can also contemplate that after an initial message is transmitted a user or groups of users, can contact the system to receive updates to the initial message with a designated user identification code. For example, a mother could log into to a website or call to a designated phone number to hear a prerecorded message or read a text message that the Hightower Elementary School is going to close early for emergency roof repairs and then again, in a day, to find out when the roof repairs will be completed.

An embodiment contemplates that the system utilize the user's caller ID to obtain updates to the initial message. For example David calls into the system, recognizes his phone number as his registered caller ID, and then provides access to an account associated with that caller ID and then offers a choice of messages, Urgent messages or non-urgent messages to play associated with his particular caller ID.

In particular, a designated user identification code can be a caller ID, another personal identification number (PIN) or another similar code, like a biometric file such as finger print of the School Superintendent.

In an additional embodiment, a receiver which has a receiver function for receiving response codes from the user which reply to the transmission feature; a storage function for recording the received response codes in DTMF or IVR format in the dynamic information database; and a reporting feature for creating customized reports using the received response codes.

In addition the responder module can accept an RSS/XML feed from a reliable source to update users or groups of users.

Still another embodiment the method includes an opt-in feature, an opt-out feature or both for users or groups of users to indicate continued participation in the system.

The embodiments have been described in detail with particular reference to certain embodiments, thereof, but it will be understood that variations and modifications can be effected within the scope of the embodiments, especially to those skilled in the art.

What is claimed is:

1. A school-wide digital notification and response system, comprising:
   a. a processor with data storage for containing computer instructions for instructing the processor to perform a series of steps;
   b. an administrator interface for transmitting a message from an administrator to a member of the group consisting of: at least one parent contact device, at least one student contact device or at least one employee contact device or combinations there, wherein each parent contact device corresponds to a parent of a school age child, and wherein each student contact device corresponds to a student in the school, and wherein each employee contact device corresponds to an employee of the school; further wherein the administrator interface comprises:
      1. a translator;
      2. an administrator "call me" feature embodied in the computer instructions; and
      3. a call-in feature embodied in the computer instructions enabling an administrator to call the school wide digital notification and response system to send a message to at least one user;
   c. a customer service interface in communication with the administrator interface comprising:
      1. a customer service representative "call me" feature; and
      2. a call-in feature embodied in the computer instructions enabling an administrator to call the school wide digital notification and response system to send a message to at least one user;
   d. a dynamic information database in communication with the processor comprising:
      1. parent data comprising:
         a. parent user contact devices information; and
         b. parent priority information that indicates a contact order for the parent contact devices; or
      2. employee data comprising:
         a. employee contact devices information; and
         b. employee priority information that indicates a contact order for the employee contact devices; or
      3. student data comprising:
         a. student contact devices information; and
         b. student priority information that indicates a contact order for the student contact devices; or combinations thereof;
      4. grouping information comprising at least a first group associated with each parent user contact device with a parent priority order for contacting each parent user contact device within the group; and
      5. response data comprising:
         a. parent response information indicates which parent contact devices have received the message; or
         b. employee response information indicates which employee contact devices have received the message; or
         c. error in response information that indicates when insufficient contact device information exists for the parent contact device, the employee contact device, the student contact device, or combinations thereof; and
   wherein the administrator uses the administrator interface to record and initiates distribution of the message using the processor and the parent data, employee data, and student data, and grouping information, with the assistance of the customer service interface, wherein the message is transmitted by the processor through at least two industry standard gateways simultaneously, and the message is received by at least one parent contact device, at least one employee contact device, or at least one student contact device, and wherein the at least one parent contact device, at least one employee contact device, at least one student contact device transmits a response through the industry standard gateways to the dynamic information database which communicates with the customer service interface and the administrator interface.

2. The system of claim 1, further wherein the administrator can call the customer service interface from an unregistered number, the administrator provides an access code, to obtain messages specific to the access code, send messages specific to the access code, or update messages specific to the access code.

3. The system of claim 1, further wherein the translator can be at least one person for translating the message in real time to be transmitted into user selected languages.

4. The system of claim 1, further comprising computer instructions for instructing a processor to broadcast a time-based message at a specified date and time.

5. The system of claim 1, further comprising computer instructions enabling administrators to cancel messages in progress and for administrators to cancel messages scheduled for delivery at a future date and time.

6. The system of claim 1, further comprising a computer instructions for notifying the administrator when all messages have been delivered to the contact devices.

7. The system of claim 1, further comprising computer instructions for broadcasting the message at predetermined periodic intervals.

8. The system of claim 1, further comprising computer instructions send messages to users within a defined geographic area.

9. The system of claim 8, wherein the computer instructions send messages to select wireless phones.

10. The system of claim 8, wherein the computer instructions select users in a designated disaster zone.

11. The system of claim 1, wherein the administrator interface reserve a conference room for group communication.

12. The system of claim 11, wherein the message requests a response enabling at least one user to enter the conference room via phone or computer link via the Internet™.

13. The system of claim 1, wherein the administrator interface controls access to the administrator interface using a member selected from the group: biometric reader, magnetic card reader, smart card reader, security token, or combinations thereof.

14. The system of claim 1, wherein the industry standard gateways include a member selected from the group: a Megaco/H.248 protocol, a Media Gateway Control Protocol (MGCP), a Short Message Service (SMS) protocol, an Enhanced Message Service (EMS) protocol, a Multimedia Message Service (MMS) protocol, SIP protocols, or combinations thereof.

15. The system of claim 1, wherein the administrator interface comprises a "call me" feature enabling a customer service representative or an administrator to compose a message to send out to a designated user or groups of users in at least one designated language with corresponding designated voice for alerting the designated user or groups of users with a custom recorded message.

16. The system of claim 15, wherein the message is an audio file, and the audio files are transmitted to the user or groups of users by email, phone, via a link on a website, or combinations thereof.

17. The system of claim 16, wherein a user or groups of users can communicate with the system and obtain updates to the message with a designated user identification code.

18. The system of claim 1, further comprising a responder module comprising:
   a. a receiver function for receiving response codes from the user which reply to the message;
   b. a storage function for recording the received response codes in DTMF or IVR format in the dynamic information database; and
   c. a reporting feature for creating customized reports using the received response codes.

19. The system of claim 18, wherein the responder module further comprises an RSS/XML feed from a reliable source to update users or groups of users.

20. The system of claim 18, further comprising an member of the group consisting of: an opt-in feature, and opt-out feature, or combinations thereof, for users or groups of users to indicate continued participation in the system.

21. The system of claim 1, wherein the administrator interface further comprises an RSS/XML feed from a reliable source to update users or groups of users.

22. The system of claim 1, wherein the grouping information further comprise at least a second group associated with each employee user contact device and an employee priority order for contacting each employee user contact device within the group.

23. The system of claim 1, wherein the grouping information further comprising at least a third group associated with each student user contact device with an employee priority order for contacting each employee user contact device within the group.

* * * * *